United States Patent [19]

Sanner

[11] Patent Number: 4,491,964

[45] Date of Patent: Jan. 1, 1985

[54] IMAGE PROCESSING INTEGRATED CIRCUIT

[75] Inventor: Medford D. Sanner, Irving, Tex.

[73] Assignee: Recognition Equipment Incorporated, Irving, Tex.

[21] Appl. No.: 586,888

[22] Filed: Mar. 9, 1984

Related U.S. Application Data

[63] Continuation of Ser. No. 342,560, Jan. 25, 1982, abandoned, which is a continuation of Ser. No. 032,034, Apr. 23, 1979.

[51] Int. Cl.³ .............................................. G06K 9/36
[52] U.S. Cl. ..................... 382/50; 358/284; 382/54
[58] Field of Search .............................. 382/41, 50–54, 382/45, 48; 358/36–37, 166–167, 213, 280, 282, 284; 333/165–167

[56] References Cited

U.S. PATENT DOCUMENTS

| | | | |
|---|---|---|---|
| 3,737,855 | 6/1973 | Cutaia | 382/54 |
| 3,964,022 | 6/1976 | Martin | 382/45 |
| 3,973,239 | 8/1976 | Kakumoto et al. | 382/54 |
| 4,074,231 | 2/1978 | Yajima et al. | 382/54 |
| 4,238,768 | 12/1980 | Mitsuya et al. | 382/52 |
| 4,315,285 | 2/1982 | Sommer et al. | 358/284 |

Primary Examiner—Leo H. Boudreau
Attorney, Agent, or Firm—Richards, Harris & Medlock

[57] ABSTRACT

An array of integrated photosensitive devices is used to lift an image of a printed character or symbol from a document or other surface, process the image to enhance character information and referencing it against a self adjusting threshold to produce a black/white video output, in serial form, representative of the image sensed by the array. Charge transfer devices are used extensively throughout on a single integrated circuit to provide a complete image processing video device on a single integrated circuit chip.

1 Claim, 15 Drawing Figures

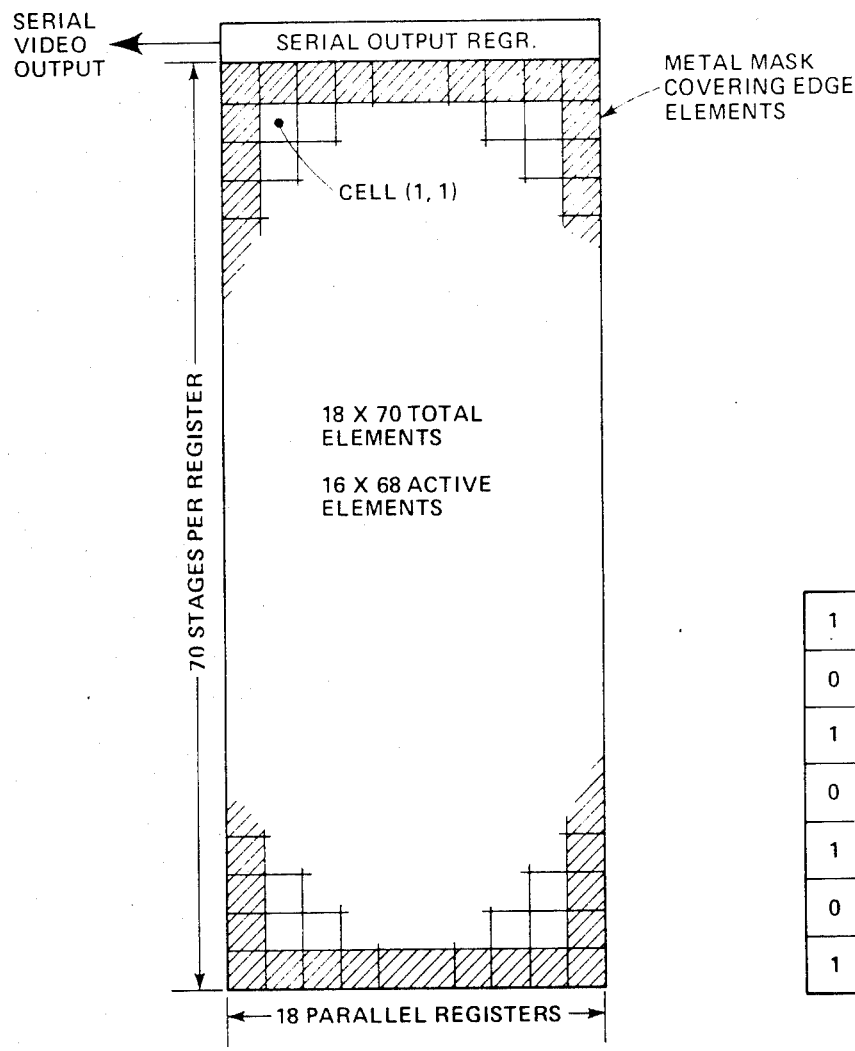
FIG. 3
FIG. 8
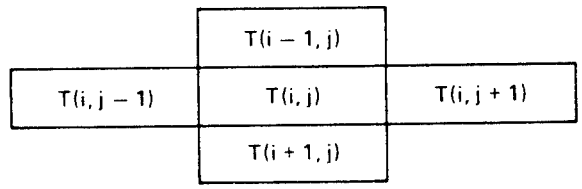
FIG. 8b
FIG. 10

4,491,964

IMAGE PROCESSING INTEGRATED CIRCUIT

FIELD OF THE INVENTION

This application is a continuation of application Ser. No. 342,560, filed Jan. 25, 1982, now abandoned, which is a continuation of application Ser. No. 032,034, filed Apr. 23, 1979.

This invention is related to image processing devices and more particularly to an integrated circuit device which process images and produces quantized black and white output video signals representative of the image scanned by the array.

BACKGROUND OF THE INVENTION

Present techniques for obtaining quantized video signals require multiple processing functions, each implemented by a combination of discrete and integrated circuits. The ability to extract a quantized video signal from degraded printing varies greatly between data lift systems, but is generally a function of the sophistication of the system.

A fairly complex system which has good thresholding characteristics with degraded printing is shown in block form in FIG. 1. The serial video signal from the single output part of an array of photosensitive elements is first amplified by a preamp in order to transmit it through an integrator. The signal is sampled at the end of the integration, and then converted to a 4 bit digital signal by the analog-digital converter. The AGC function serves to normalize the A/D output, always producing 16 gray levels for a range of video input levels.

The purpose of the converter is to drive the correlator function. The correlator is a digital filter that quantizes a 4 bit signal to a black or white level based upon the sum of the cells surrounding a cell. Approximately 20 MSI and SSI logic packages are required to implement the control function and timing signals that tie all the functions together.

The present invention has equal or greater thresholding characteristics and can be implemented in a single integrated circuit. This integrated circuit with several external components, replaces all the functional block shown in FIG. 1.

A parallel video processing system is described in U.S. Pat. No. 4,074,231, however in this patent a predetermined threshold value is used in processing the video. This does not allow for varying background shades or a variable threshold to allow for variances in the print contrast ratio.

Image processing systems similar to FIG. 1 are described in U.S. Pat. Nos. 3,947,817; 3,964,022; and 4,075,605.

SUMMARY OF THE INVENTION

The invention provides an effective and economical way to transform an optical image of a printed character or other symbols to an electrical signal which is quantized to represent black and white levels. This type of quantized signal is required by almost all optical character recognition systems utilized in optical character recognition equipment.

The device described may be utilized, for example, in a handheld OCR reader to supply signals representing the character to the recognition logic. The system consists of a pulsed infrared emitting diode illumination source and an integrated circuit which includes both an image sensor and an analog signal processing section.

The optical image projected onto the sensor is transformed into a stream of digital video data representing black or white levels.

DESCRIPTION OF THE DRAWINGS

The features of the invention and the technical advance represented thereby will be more fully understood when considered in conjunction with the following specification, claims and drawings in which:

FIG. 2b is a block representations of the video threshold processing circuit enclosed in the dashed lines of FIG. 2a;

FIG. 3 illustrates the sensor array;

FIG. 8 illustrates the sample point configuration within the 7×7 matrix of FIG. 7;

FIG. 8b shows filter coefficients for the impulse response matrix;

FIG. 10 illustrates the spot filter image matrix shown in FIG. 2;

DESCRIPTION OF THE PREFERRED EMBODIMENT

Figure 1:
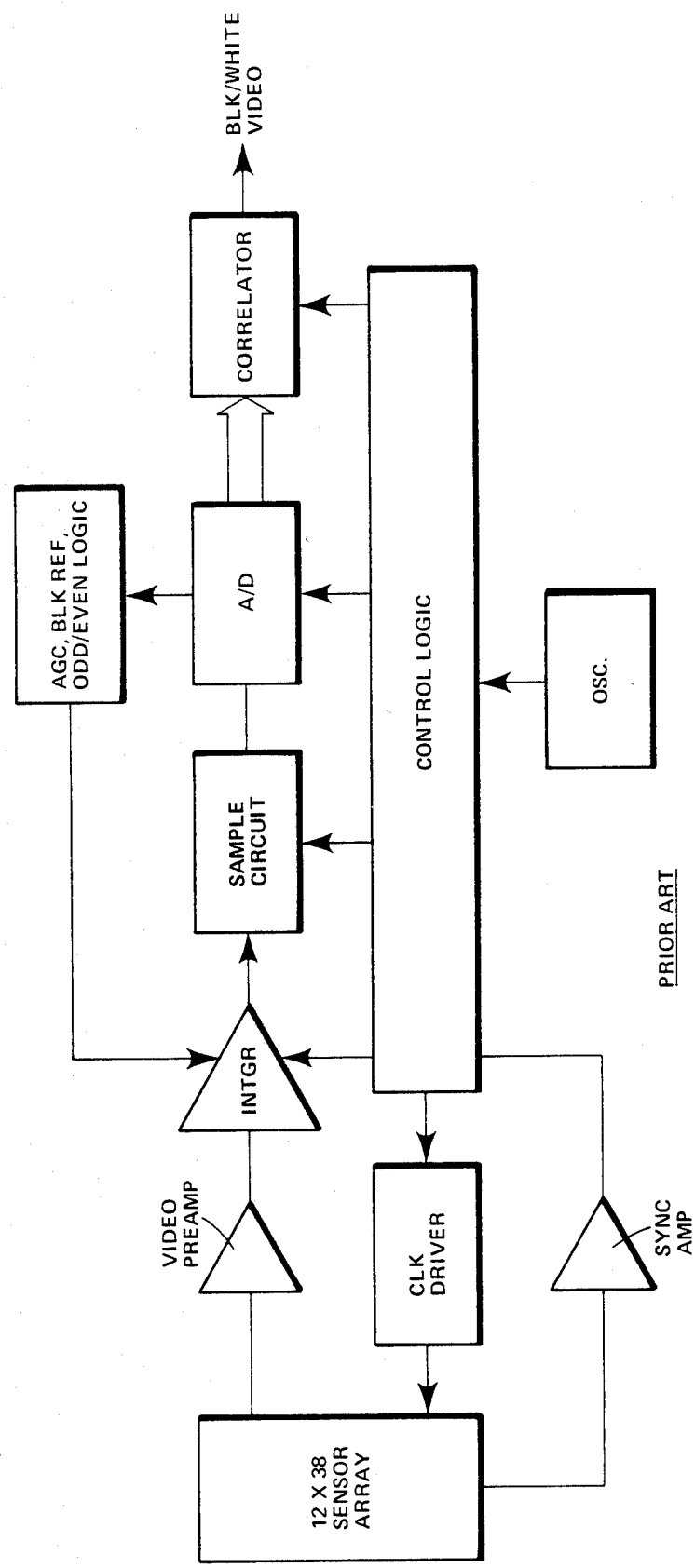
FIG. 1 is a block diagram of a prior art circuit.
Figure 2A:
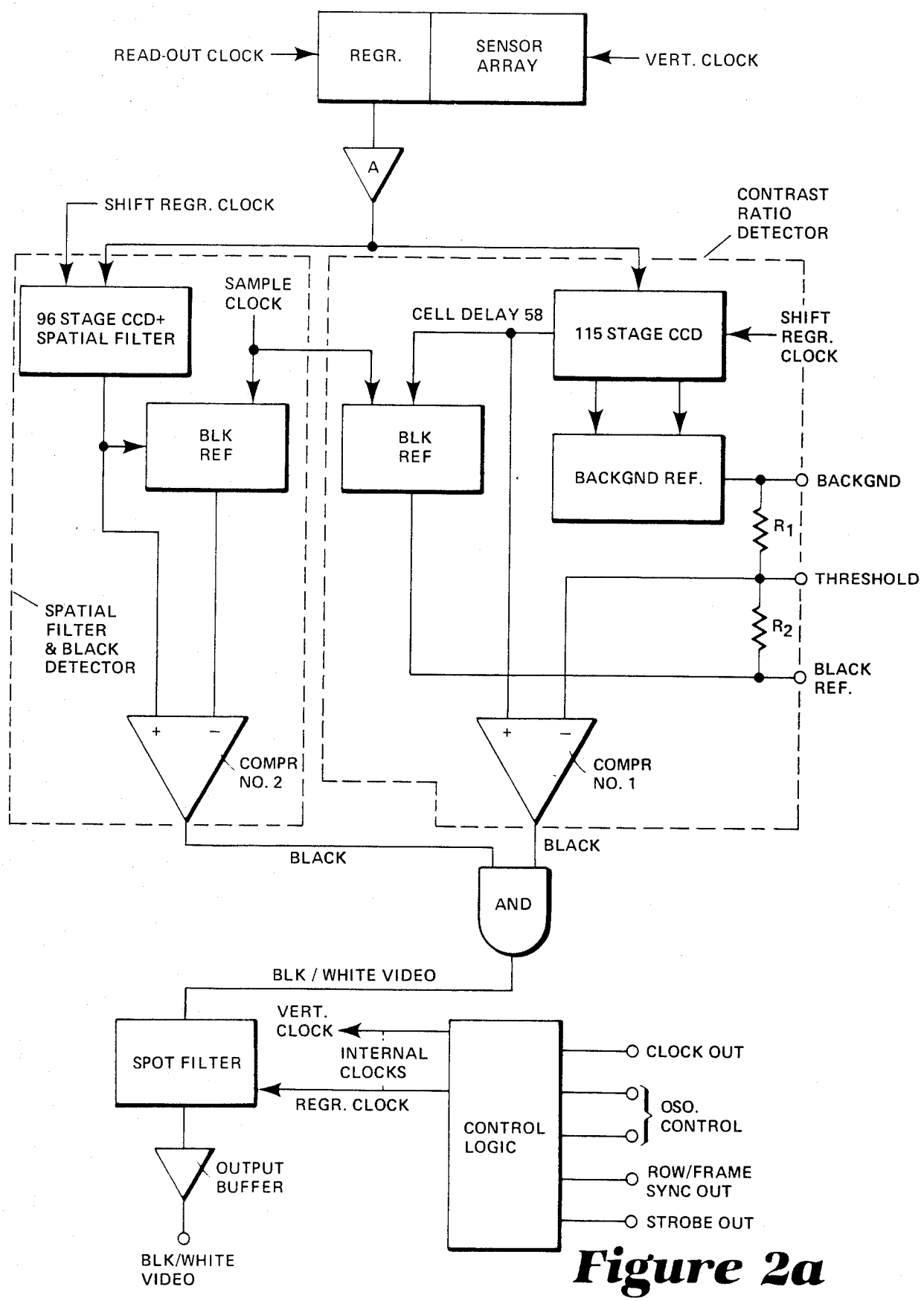
FIG. 2a is a block diagram of the present invention.

The system is a data lift system that consists of a pulsed infrared emitting diode illumination source and an integrated circuit comprising both an image sensor and an analog signal processing section. A block diagram of the system is illustrated in FIG. 2a. The function of the video processor, enclosed in dashed lines in FIG. 2a, is to convert video signals produced by a two dimensional optical sensing array to a high quality black/white output signal. The array output directly feeds the processor without the benefit of an AGC amplifier which means that the processor must allow for variations in signal levels caused by average illumination level changes, typically in the 4:1 range. In addition, image shading caused by nonuniform illumination or array sensitivity must be accommodated.

Since the output is to be used for OCR, special processing of printed character images is required to produce an optimum black/white image. That is, light strokes within a character should be thresholded black and enclosed areas (e.g. 8's and A's) though smudged, should be white.

The array signal is processed by two parallel paths with the results combined to produce a black or white decision for each pixel.

The contrast ratio detector performs the function of determining if a pixel is dark enough to exceed the minimum acceptable modulation. The minimum modulation is defined as a print contrast ratio (PCR) value in the range of 0.15 to 0.25. This level is determined on a pixel to pixel basis by continuously monitoring the amplitude of the white area surrounding a pixel.

The white amplitude is measured relative to a zero reference that is established during each image frame cycle. The minimum PCR value is a fixed percentage of the white amplitude. Since the PCR is a ratio function, changes in average video levels will not affect the quality of the thresholded video.

The spatial filter section of the parallel processing contains a spatial filter that performs edge enhancement of the image data. The filter coefficients are selected to emphasize character stroke type images, allowing low contrast characters to be detected. The filter output is compared to a second black reference to produce a digital black/white output as a result of the spatial filter.

The two outputs from the parallel processing functions are combined by an "AND" circuit; both functions must produce black in order for a pixel to be judged black.

The contrast radio detector function serves to prevent paper noise from thresholding, particularly at the higher light levels, while the spatial filter function results in good edge definition for the character images.

Figure 4:
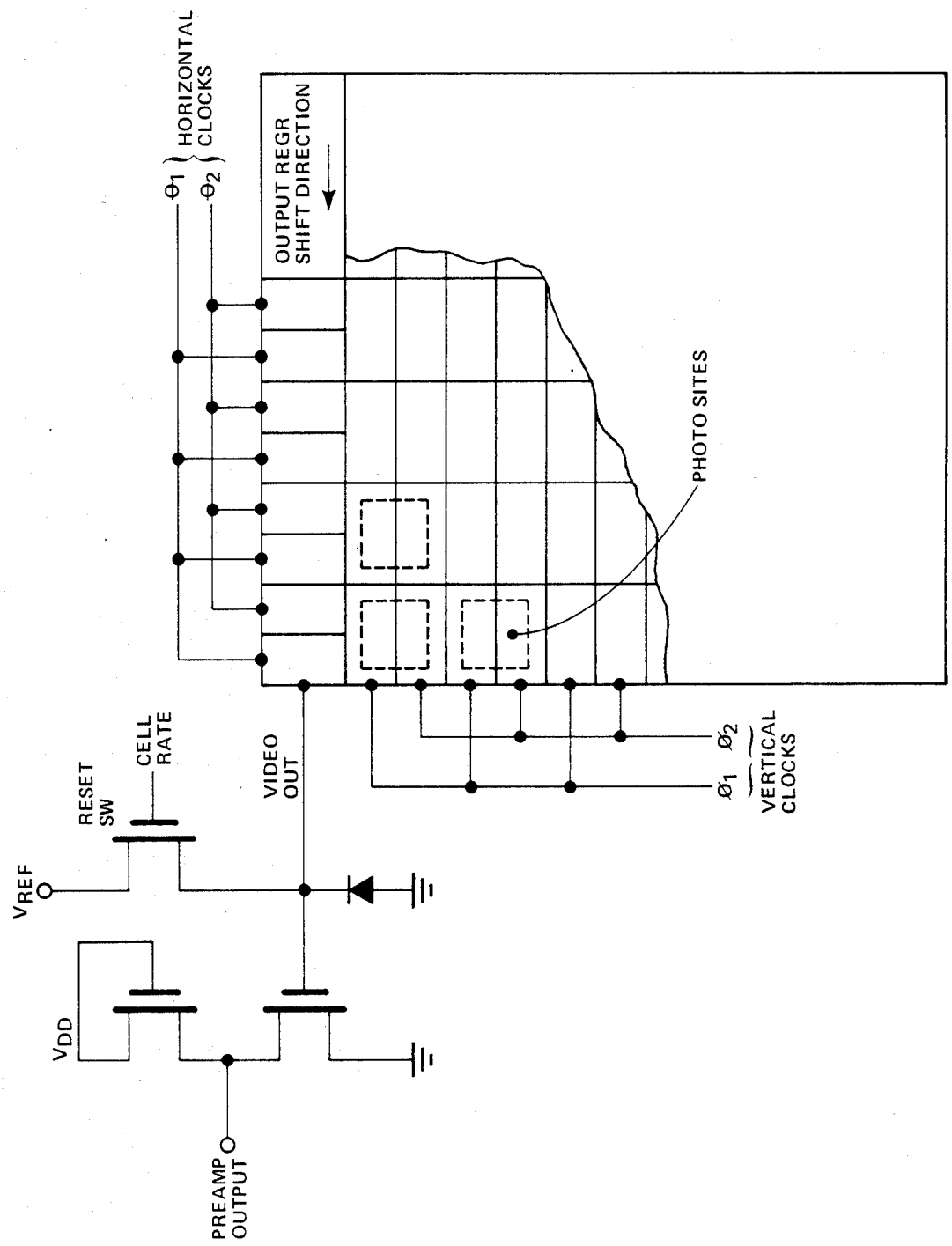
FIG. 4 is a schematic diagram of the sensor array.

Looking at FIG. 4, there is illustrated one possible embodiment of the CCD sensor array. The photosites are stages of vertical registers which are read out by vertically clocking all registers to parallel load the output register. The output register (as illustrated) shifts to the left, shifting the video out at the cell rate through a preamplifier and then to the parallel registers.

The sensor array may be, for example, area sensor 18 cells wide and 70 cells tall (FIG. 3). The sensor may be, for example, a CCD device consisting of 18 shift registers each 70 bits in length. Each stage serves both as a sensor and a storage/read out device. In operation, an image is strobed on to the sensor using a pulsed infrared emitting diode as an illumination source. As soon as the diode is off, the 18 registers are shifted one bit, loading the serial read out register.

The read out register is clocked 18 pulses to produce a serial bit stream output. A second shift pulse to the 18 vertical shift registers is then produced and the cycle is repeated a total of 70 times until all the data has been read out. This type of read out can only be utilized because the sensor is not illuminated during the read out sequence. The illumination time will comprise about 10% of the total frame time. This design has the advantage of requiring a much simpler CCD structure whose total cell area is light sensitive and thus twice as sensitive as a sensor structure that utilizes alternate sensor and storage sites.

The spatial filter is a linear filter designed to amplify portions of the image that correspond to character stroke characteristics. The spatial filter performs two dimensional discrete circular convolution of a two dimensional spatial impulse response with the sensor's image data. Two dimensional convolution can be described generally as follows:

The impulse response matrix (IRM) is placed over a section of the image data matrix. The IRM is smaller than the data matrix, and has an odd number or rows and columns. Each location is multiplied in the IRM by the corresponding location of the data matrix. The resulting matrix of numbers is summed to get one number. The resulting number is placed into the filtered data matrix at the same location as the center cell of the IRM was on the original data matrix.

For two dimensional circular convolution, the data matrix is treated as if the rows and columns were wrapped around cylinders, so when the IRM extends off of the edge of the data matrix, rows or columns from the opposite edge are utilized for data. This process is defined mathematically as follows:

$$Z(i,j) = \sum_{r=\frac{N-1}{-2}}^{\frac{N-1}{2}} \sum_{s=\frac{P-1}{-2}}^{\frac{P-1}{2}} \cdot M(r,s) \times D(i+r, j+s)$$

$i = 1,2,\ldots R$
$j = 1,2,\ldots S$

Z(i,j) is the two dimensional filtered image matrix. The top lefthand corner cell is defined as i=1 (row) and j=1 (column), or Z(1,1). Z is a R row by S column matrix.

M(r,s) is the two dimensional impulse response of the system. The number of rows is N and the number of columns is P. The top row of the M matrix is numbered N-1/-2 and the left column is numbered P-1/-2. Therefore the top left-hand corner cell is defined as:

$$M\left(\frac{N-1}{-2}, \frac{P-1}{-2}\right) \text{ or, for } N = P = 7, M(-3, -3) \text{ is the}$$

corner cell. Therefore the center cell of M is M(0,0) for any odd N and P.

D(i+r, j+s) is the two dimensional image matrix. The top left-hand corner cell is defined as i+r=1 (row) and j+s=1 (column) or D(1,1). D is a R row by S column matrix.

For circular convolution for a R row by S column matrix, the data matrix repeats periodically in all directions of its plane, or D(i+R, j+S)=D(i,j) where D is an R×S matrix. Two dimensional convolution can be implemented by a tapped analog delay register with N groups of P taps (IRM is N rows by P columns weighted by M(r,s) and summed. The impulse response matrix has weighting values in the range of 0 to ±1. A typical set of coefficients is shown in FIG. 8b.

Figure 5:
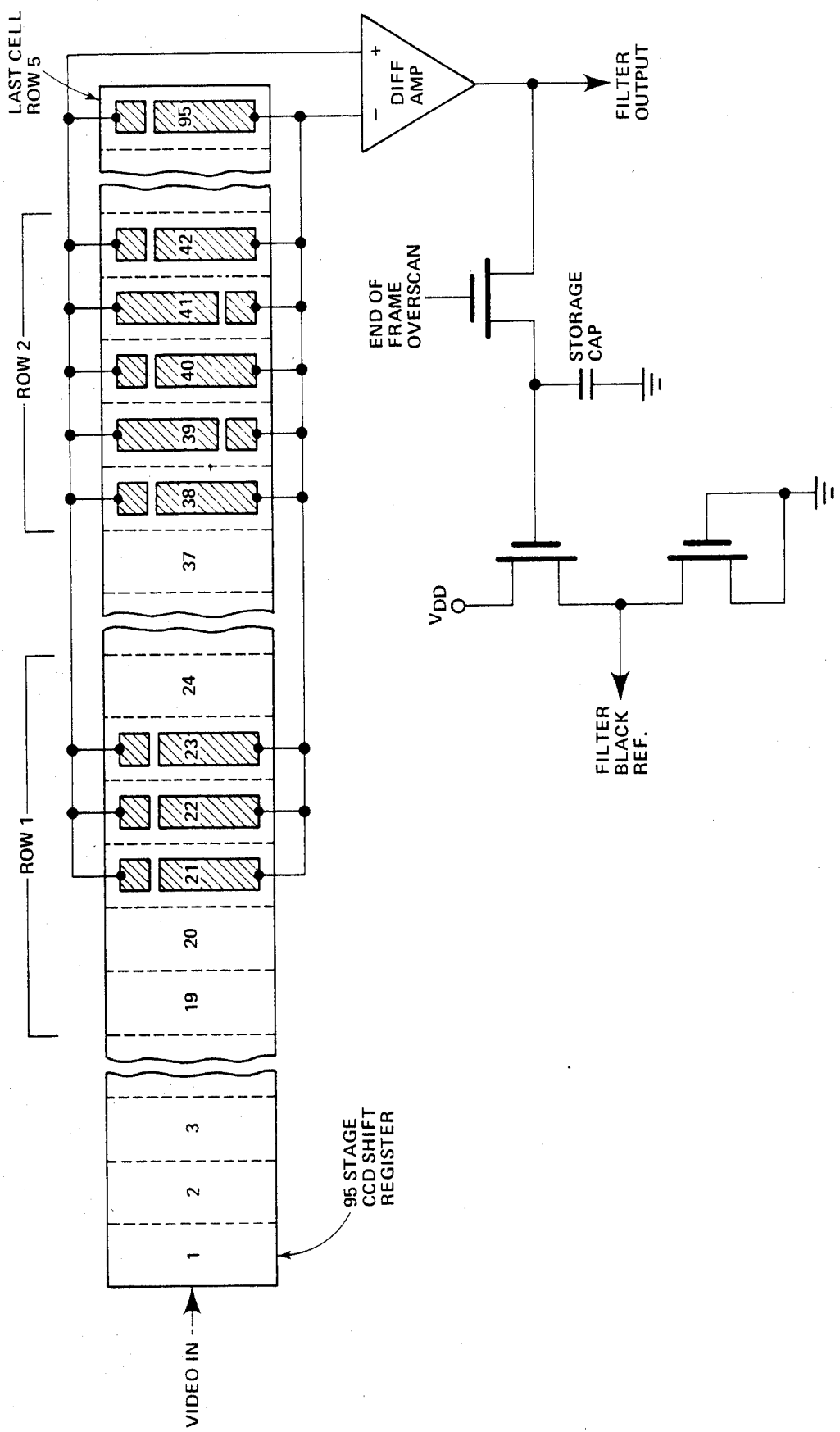
FIG. 5 is a schematic diagram of the 96 stage CCD array spatial filter illustrated in FIGS. 2 and 3.

The filter is designed to have an output that goes negative for dark areas of video image and positive for white areas. One possible embodiment of the filter is the 96 stage CCD shift register with split electrodes as taps as illustrated in FIG. 5.

The video is fed into one end of the shift register in serial form. The output from the differential amplifier constitutes the filter output. This type of split electrodes charge sampling structure and its application to transversal filters is well know in the literature and explained in the book *Charge-Transfer Devices* by G. S. Holbson, John Wiley & Sons published on page 106.

Figure 2B:
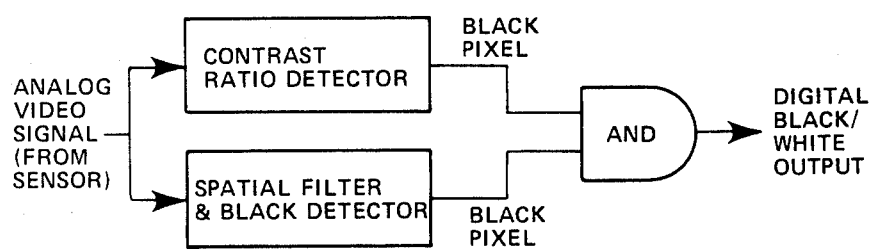

Comparator 2 in FIG. 2 is for the purpose of determining whether the spatial filter output is positive or negative relative to a black reference level signal. When the spatial filter output is negative, the comparator output is true indicating a black level. The black reference level is produced by sampling the output during the time that only black pixel data is contained within the spatial filter CCD shift register. The output is sampled at the end of the overscan time and stored on a capacitor to be utilized during the next frame as a black reference level.

Figure 6:
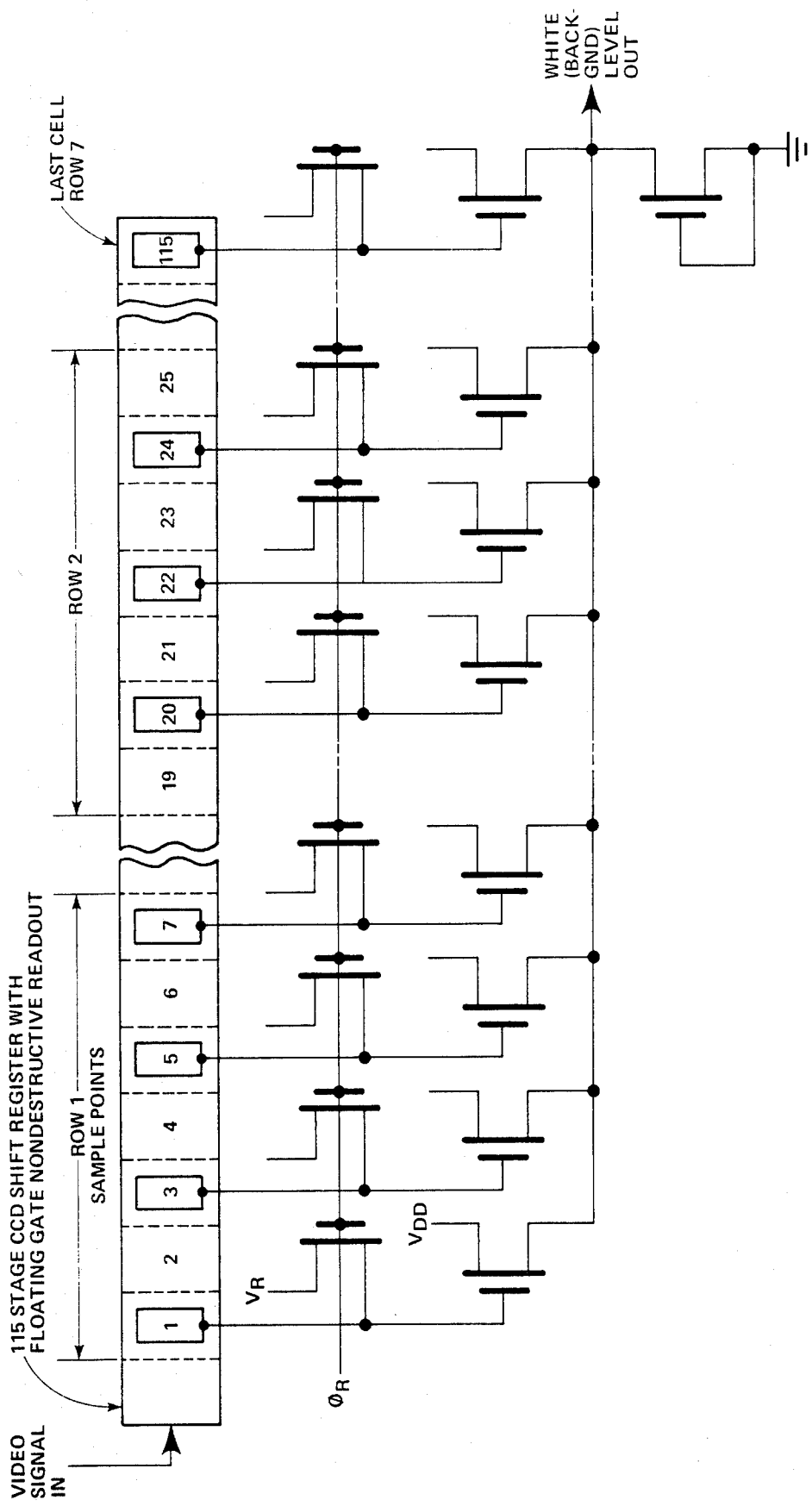
FIG. 6 is a schematic diagram of the 115 stage CCD array used for the white reference detector illustrated in FIG. 2.

In order to implement the contrast ratio detection function, it is necessary to have some temporary storage of cell values. This needs results from having to analyze data that in spatial terms surrounds any given cell, or expressed as a time function, is generated both before and after the time of a given cell. A well known way to provide this storage when performing real time processing is to use a tapped delay line. The 115 stage CCD register shown in FIG. 6 accomplishes this function with analog data. The transistor and electrode configuration shown in FIG. 6 illustrates an established approach for converting the charge pockets propagating down the delay line to voltage levels in a nondestructive manner. In effect, there are 24 taps on the delay line producing data representing 24 different cells that are accessible in parallel. FIG. 6 ilustrates the read out approach without indicating the clocking phases required to propagate the charges down the delay line. The clocking technique can be anything from a 1½ to a 4 phase system. This readout technique is explained in the book *Charge Coupled Devices & Systems,* edited by Howes and Morgan, John Wiley and Son publishers, on page 75.

The contrast ratio detection function contains a background reference detector which performs a limited area spatial peak detection of the sensors image data.

Figure 7:
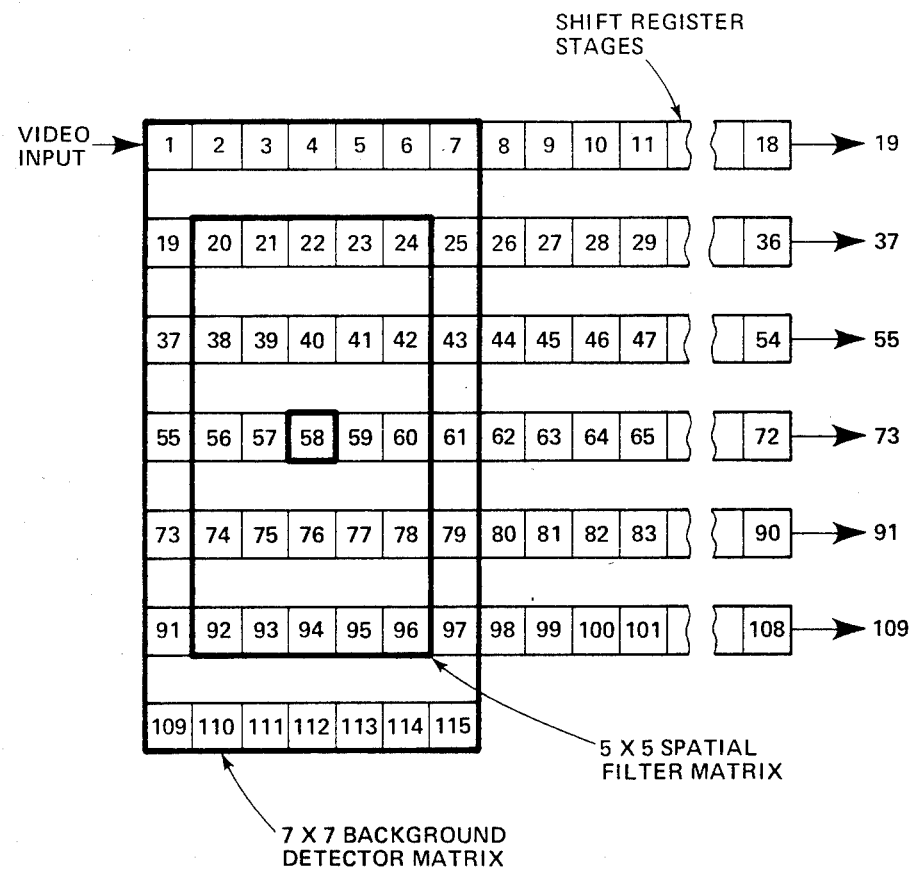
FIG. 7 illustrates the 7×7 background detector matrix.
Figure 11:
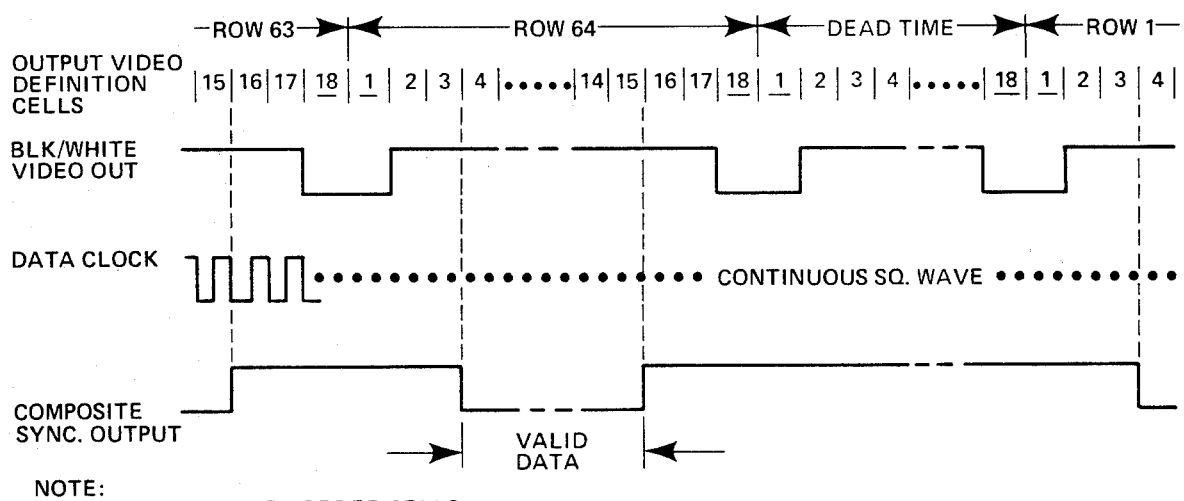
FIG. 11 is a timing diagram of the black/white video signal.

The reference detector produces an output level for each cell that is representative of the white level in the vicinity of the cell. The background level is produced when the cell value passes through delay stage 58 (see FIG. 7). In order to simplify hardware problems in building the detector, the 7×7 area is represented by 24 sample points in a checkerboard pattern as shown in FIG. 8a.

The spatial peak detection funcition can be described generally as follows

A U row by V column matrix is placed over a section of the image data matrix. This U by V matrix is smaller than the data matrix and has an odd number of rows and columns. The K highest image data values are selected in the data matrix section covered by the U by V matrix. K will be less than U×V. Next sum the K highest values together and divide by K.

The resultant value is placed into the reference matrix at the same location as the center cell of the U by V matrix. As with circular convolution, the data matrix wraps around in the horizontal and vertical directions. This process is defined mathematically as:

$$R(i,j) = \frac{1}{K} \sum_{n=1}^{K} [\text{Max}_n] \begin{bmatrix} D(1+r, j+s) \\ r = \frac{U-1}{-2} \ldots \frac{U-1}{2} \\ s = \frac{V-1}{-2} \ldots \frac{V-1}{2} \end{bmatrix}$$

where
$i = 1,2 \ldots R$
$j = 1,2 \ldots S$

R(i,j) is the two dimentional reference matrix. R(1,1) is the top left-hand corner of the matrix. D(r,s) is the image data matrix. D(1,1) is the top left-hand corner of the matrix. D is an R row by S column matrix. U is the number of rows in the area considered for peak detection (U is odd). V is the number of columns in the area considered for peak detection (V is Odd). U and V may be as large as 7. [$\text{Max}_n$] means the highest value of the right argument As in circular convolution $D(i \pm r, j \pm s) = D(i,j)$, where D is an R×S matrix.

After R(i,j) is developed, it is multiplied by a fractional constant A to produce the minimum PCR limit which is used to threshold the image data.

Specifically referring to FIG. 2 comparator number 1 is driven by a fraction of the background reference output and the signal from the "center cell" (indicated in FIG. 7 as cell 58) which is the video information that is to be quantized.

The resistors R1 and R2 determine the fraction of background level to be supplied to the comparator. This would be typically about 0.85, corresponding to a print contrast ratio of 15%. Comparator number 1 output will be true, indicating white, if the center cell value is less than 0.85 of the white reference.

A black reference value is also produced by the contrast ratio detection function. It is used as the "zero" value for the R1/R2 divider which allows a fractional level of the white background reference to be obtained. It is produced by sampling the output from cell 58 at the end of the array overscan time and storing the level on a capacitor for use during the next frame of video.

Comparators 1 and 2 are combined by an AND circuit to produce a quantized black/white output. The signals are AND'ED on a black basis so that both comparator outputs are required to produce a black pixel. Comparator 1 will force a white output for a low contrast signal and comparator 2 will open up the white areas in an 8, A, or other alphanumeric characters having an enclosed or partially enclosed area. The output of the AND circuit is further processed by a spot filter to remove isolated white or black cells from the output. The spot filter operates on the threshold matrix by the following function:

$$A(i,j) = T(i-1,j) + T(i+1,j) + T(i,j-1) + T(i,j+1)$$

$$S(i,j) = \begin{cases} 1 \text{ if } A(i,j) = 4 \\ T(i,j) \text{ if } 0 < A(i,j) < 4 \\ 0 \text{ if } A(i,j) = 0 \end{cases}$$

where S(i,j) is the two dimensional spot filtered image matrix, the top left element of the matrix is S(0,0). A(i,j) is the sum of the binary values (0–1) of the 4 on axis, adjacent cells to the cell to be spot filtered in the threshold matrix (see FIG. 10).

Figure 9:
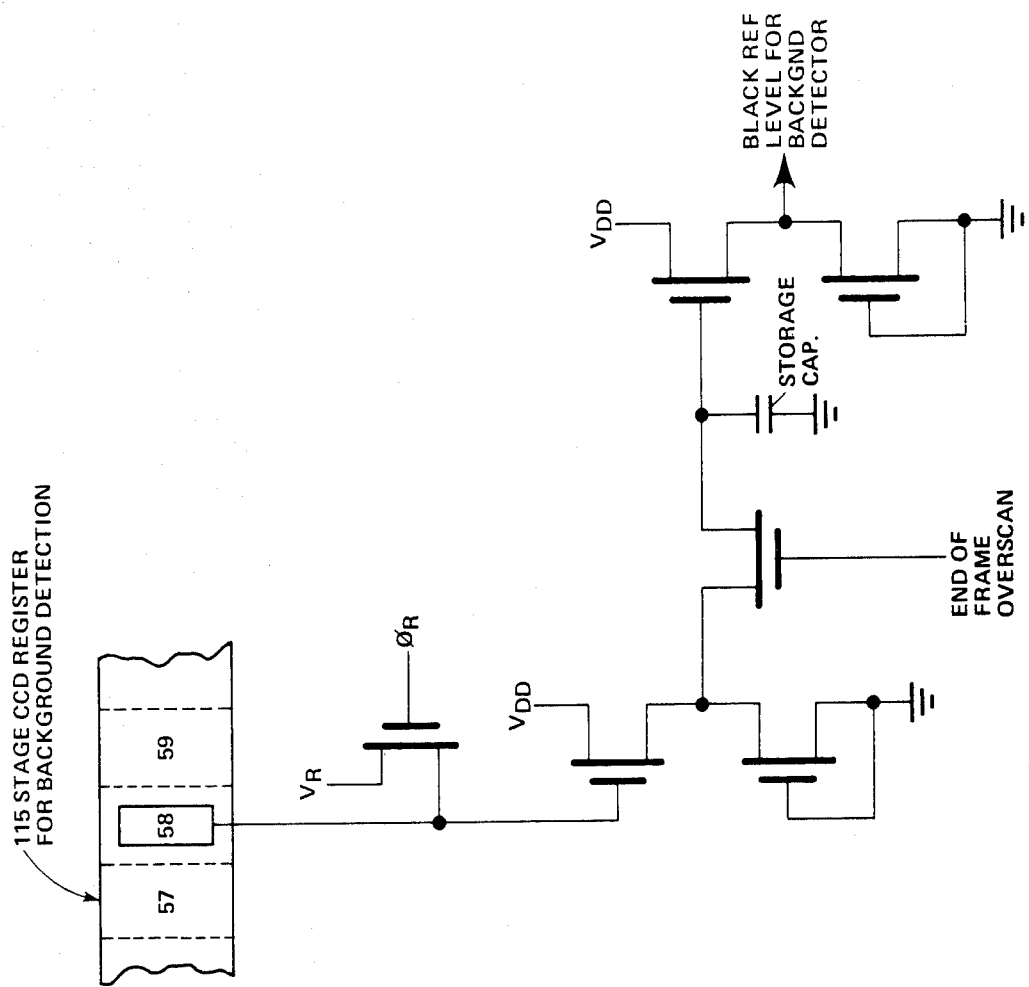
FIG. 9 is a schematic diagram of the black reference circuit.

If the four surrounding cells for a particular cell are all the same, the spot filter forces the center cell to the same value of the surrounding cells. Otherwise, the filter does nothing to the center cell. FIG. 9 represents the function of four adjacent cells and a center cell. The spot filter is tapped CCD register feeding the appropriate logic elements. In addition to the delay resulting from this function, more delay is incorporated here to synchronize the video with the Row/Frame Sync signals generated for the system.

In addition to the black/white data output, timing signals for external logic synchronization are provided by the control logic as shown in FIG. 2.

These are Data Clock Out, Row/Frame Sync, and Strobe Out. The Data clock is used in sampling the serial video stream and the Row/Frame Sync provides for horizontal and vertical location.

Strobe Out triggers the infrared emitting diodes which illuminate the surface to be scanned or read. A Background Signal Level Output, and the black reference are also available to be used as an indication of the video signal so that the black/white output can be externally inhibited if the illumination level is inadequate.

Figure 12:
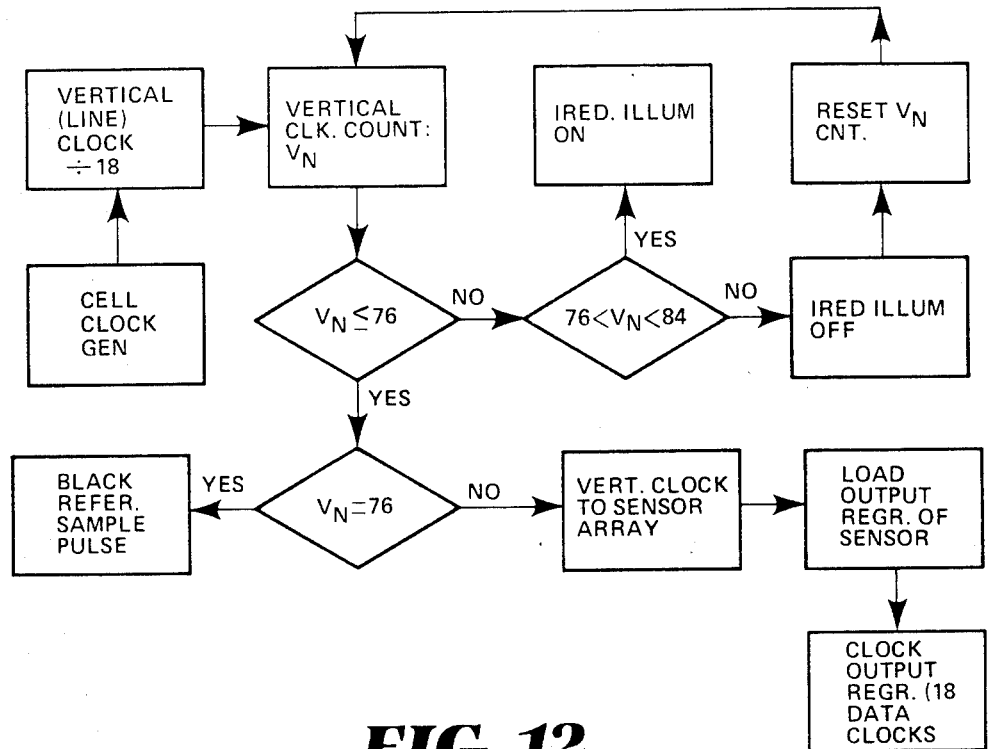
FIG. 12 is a flow diagram of the major timing sequence.

Description of major timing sequence is illustrated in the flow diagram of FIG. 12. A vertical clock is generated for each 18 cell rate pulses and are counted by a vertical clock counter. If the count is equal to or less than 76, a vertical clock is gated to the sensor array causing the cell or fixed data to advance by a row toward the read-out register. If the count is 73 a black reference sample pulse is generated in addition to vertically clocking the sensor.

After each vertical clock the cell data in the sensor output register, which consists of a horizontal row of cells, is serial read-out into the signal processing CCD registers by 18 cell data clocks. After 70 vertical clocks, all the image data produced by the 68 active rows of cells have been read out. Between the 70th and 76th vertical clocks, all cell data output represent absolute black cell values. This portion of the frame cycle is the overscan time that results in loading the signal processing CCD register with black signal levels.

When the $V_N$ count reaches 76, the black reference sample pulse is produced and vertical clocking of the sensor is inhibited. Between the counts of 77 and 84 the infrared illumination is turned on to expose a new image on the array. At the count of 84, $V_N$ is reset to zero and the frame cycle is repeated.

Figure 13:
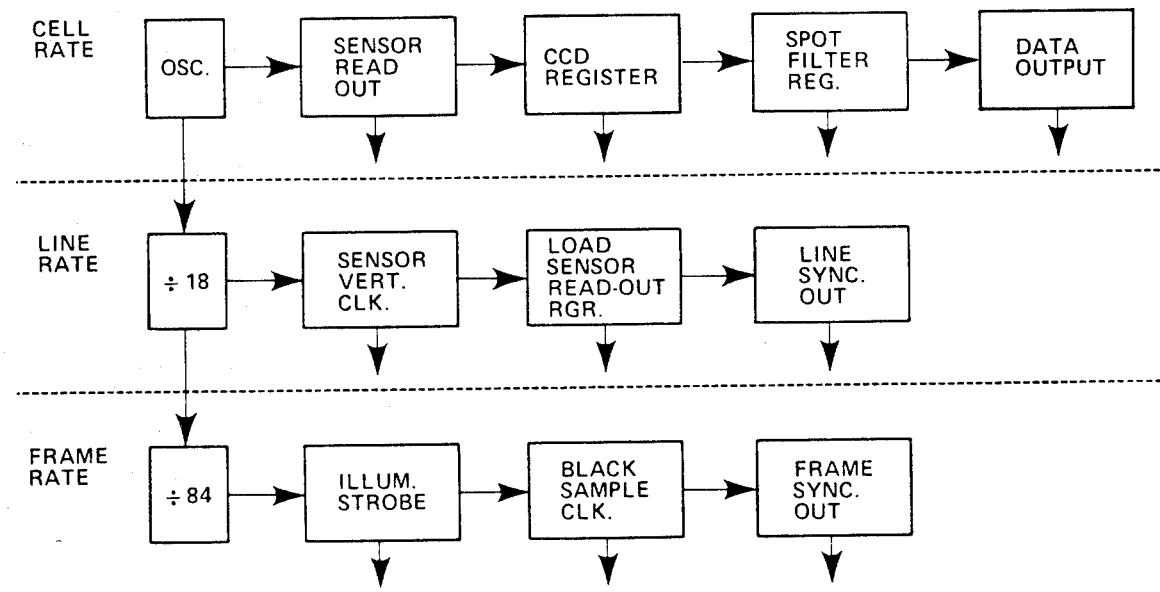
FIG. 13 is a block diagram of the relation ratio for internal and external clocks.

The relative rates for internal and external clocks are illustrated in FIG. 13. The output register is then parallel loaded with the video data and then read out, requiring 18 data clocks.

The relative rates for internal and external clocks are illustrated in FIG. 13.

Having described a preferred embodiment of the Image Processing Integrated Circuit, other embodiment and arrangements will become apparent to those skilled in the art which will fall within the scope of the appended claims.

What is claimed is:

1. An image processing system for detecting the presence or absence of a marking in a cell location on a document comprising:
   an array of photosensitive cells for sensing the presence or absence of a marking in each cell location on the document;
   said array of photosensitive cells producing analog signals representing levels of black or white, corresponding to the presence or absence of a marking in each cell location;
   processing means for processing said analog signals to produce quantized black and white video signals;
   said processing means including first and second parallel processing channels;
   said first processing channel including filter means for receiving said analog signals and for performing edge enhancement to generate a filtered output signal;
   said first processing channel further including comparator means for comparing said filtered output signal with a fixed reference signal level and for producing a first logic signal when said filtered output signal exceeds said fixed reference signal level;
   said second processing channel including means for generating a variable reference signal level representing a print contrast ratio value from the cells surrounding a cell having a marking;
   said second processing channel further including comparator means for comparing said analog signals with said print contrast ratio value for producing a second logic signal when said analog signals exceed said print contrast ratio value;
   said first and second logic signals being synchronously produced with respect to said analog signals of said photosensitive cells; and
   said processing means further including means for logically combining said first and second logic signals to produce a quantized black and white video signals.

* * * * *